United States Patent [19]

Okita et al.

[11] Patent Number: 4,716,077

[45] Date of Patent: Dec. 29, 1987

[54] MAGNETIC RECORDING MEDIUM

[75] Inventors: Tsutomu Okita; Hiroshi Hashimoto; Masashi Aonuma, all of Kanagawa, Japan

[73] Assignee: Fuji Photo Film Co., Ltd., Kanagawa, Japan

[21] Appl. No.: 884,450

[22] Filed: Jul. 11, 1986

[30] Foreign Application Priority Data

Jul. 12, 1985 [JP] Japan .................................. 60-152503

[51] Int. Cl.$^4$ ............................................. G11B 5/702
[52] U.S. Cl. ...................................... 428/328; 427/44; 427/54.1; 427/128; 428/329; 428/425.9; 428/694; 428/695; 428/900; 428/522
[58] Field of Search ...................... 428/694, 695, 425.9, 428/328, 329, 900; 427/131, 128, 44, 54.1; 252/62, 54; 360/134–136

[56] References Cited

U.S. PATENT DOCUMENTS

| 4,521,486 | 6/1985 | Ninomiya | 428/900 |
|---|---|---|---|
| 4,571,364 | 2/1986 | Kasuga | 428/425.9 |
| 4,576,866 | 3/1986 | Okita | 428/425.9 |
| 4,594,174 | 6/1986 | Nakayama | 428/900 |
| 4,600,521 | 7/1986 | Nakamura | 428/329 |
| 4,621,027 | 11/1986 | Okita | 428/694 |

Primary Examiner—Ellis P. Robinson
Attorney, Agent, or Firm—Sughrue, Mion, Zinn, Macpeak & Seas

[57] ABSTRACT

A magnetic recording medium is described, comprising a non-magnetic support and a magnetic layer, said magnetic layer containing as a binder at least one compound selected from each of compound groups (A) and (B) that has been exposed to radiation, wherein (A) is polyvinyl chloride type compounds containing at least one polar group and at least one carbon-carbon unsaturated bond per molecule; and (B) is polyurethane type compounds containing at least one —$CO_2H$ group and at lease one carbon-carbon unsaturated bond per molecule.

17 Claims, No Drawings

MAGNETIC RECORDING MEDIUM

FIELD OF THE INVENTION

The present invention relates to a magnetic recording medium such as a video tape, an audio tape, tapes and floppy disks for computers, and the like.

BACKGROUND OF THE INVENTION

A commonly and widely used magnetic recording medium uses as a binder a thermoplastic resin such as a vinyl chloride and vinyl acetate type resin, a vinyl chloride and vinylidene chloride type resin, a cellulose type resin, an acetal type resin, a urethane resin, or an acrylonitrile butadiene resin alone or in combination. However, this type of magnetic recording medium has defects such as that wear resistance of a magnetic layer is so poor that a tape of a magnetic tape stains.

Further, it is known that a thermosetting resin such as a melamine resin or a urea resin is used as a binder or that a binder which is crosslinked by a chemical reaction such as an isocyanate compound or a compound having an epoxy ring is added to the above-described thermoplastic resin. However, the use of the crosslinkable binder is accompanied by defects such as that (1) a resin solution having magnetic particles dispersed therein has poor storage stability, and physical properties of a magnetic coating composition are not uniform and thus a magnetic recording medium cannot maintain its uniform quality, and that (2) a heat treatment for hardening a coated layer which is coated and dried is indispensable, and for the heat treatment it takes a long term.

In order to overcome the above defects, it is disclosed in Japanese Patent Publication No. 12423/72, Japanese Patent Application (OPI) Nos. 13639/72 (the term "OPI" as used herein means an "unexamined published application"), 15104/72, 77433/75, and 25231/81 that a magnetic recording medium is prepared by using an oligomer and a monomer of an acrylic acid ester type and hardening it by radiation exposure after it is dried. However, a magnetic recording medium having high electromagnetic properties and running durability cannot be obtained by the above mention.

Recently, a magnetic recording medium has been required to have higher image quality. In order to realize high image quality, it is necessary that a surface of a magnetic layer is more closely contacted with a video head and an audio head, that a surface smoothness of a magnetic recording medium is improved as well as dispersibility of ferromagnetic particles. On the other hand, the smoother the surface of a magnetic layer is, the higher is the friction coefficient of a running system using a video tape recorder, and running tension becomes higher. Therefore, a magnetic recording medium is required to have higher running durability under harsh conditions. In this connection, hitherto, a magnetic recording medium which completely satisfies all requirements as to surface smoothness of a magnetic layer, dispersibility of ferromagnetic particles and running durability of ferromagnetic particles, and running durability has not been produced in accordance with conventional methods.

In order to overcome the above-described defects, the inventors of the present invention have made extensive research as to a method of using a thermoplastic resin and a thermosetting resin, adding a binder crosslinkable with a chemical reaction thereto, and using a binder hardenable by crosslinking with radiation, and have finally attained the present invention.

SUMMARY OF THE INVENTION

An object of the present invention is to provide a magnetic recording medium which is furnished with characteristics such as that (1) electromagnetic properties are excellent, (2) the ferromagnetic particles have good dispersibility, (3) storage stability of the magnetic coating composition therefore is excellent, (4) the magnetic recording medium formed has uniform qualities, (5) running durability is excellent, and (6) heat treatment for hardening the coated layer is unnecessary.

The above-described problems can be overcome by the present invention, namely, a magnetic recording medium comprising a non-magnetic support and a magnetic layer, said magnetic layer containing as a binder at least one compound selected from each of groups (A) and (B) that has been exposed to radiation, wherein (A) is polyvinyl chloride type compounds containing at least one polar group and at least one carbon-carbon unsaturated bond per molecule, and (B) is polyurethane type compounds containing at least one —$CO_2H$ group and at least one carbon-carbon unsaturated bond per molecule.

According to one preferred embodiment of the magnetic recording medium, (A) is a polyvinyl chloride type compound containing a —$CO_2H$ group and a carbon-carbon unsaturated bond and has an acid value of from 1 to 30.

According to another preferred embodiment of the magnetic recording medium, (B) is polyurethane acrylate or methacrylate containing a —$CO_2H$ group and has an acid value of from 1 to 30.

According to still another preferred embodiment of the magnetic recording medium, ferromagnetic particles are used in the magnetic layer, and said particles are ferromagnetic alloy particles having BET specific surface area of 30 $m^2/g$ or more.

DETAILED DESCRIPTION OF THE INVENTION

The polyvinyl chloride compounds (A) containing at least one polar group and at least one carbon-carbon unsaturated bond per molecule include copolymers such as a copolymer of vinyl chloride type, a copolymer of vinyl chloride and vinyl acetate type, a copolymer of vinyl chloride and vinyl propionate type, or a copolymer of vinylidene chloride and vinyl acetate containing at least one polar group selected from —$CO_2H$, —OH, —$SO_3H$, —$SO_3Na$, —$OPO_3H$, and —$OPO_3Na$ and a carbon-carbon unsaturated bond. Preferred polar groups are —$CO_2H$ and —OH groups, and an especially preferred polar group is a —$CO_2H$ group. When a polar group is a —$CO_2H$ group, an acid value thereof is preferably from 1 to 30, more preferably from 3 to 20, and most preferably from 5 to 15. The dispersibility of ferromagnetic particles becomes poor and electromagnetic properties tend to be impaired outside of the broadest ranges above.

A preferred average content of carbon-carbon unsaturated bonds is from 1.5 to 20, and more preferably from 2 to 15, per molecule. The molecular weight thereof is generally from 5,000 to 50,000, and preferably from 10,000 to 30,000. Outside of the above ranges, the hardening reaction does not proceed well and durability tends to become poor.

Polyvinyl chloride type copolymers include vinyl chloride and vinyl acetate copolymers, vinyl chloride, vinyl acetate, and maleic acid copolymers, vinyl chloride, vinyl acetate, and vinyl alcohol copolymers, vinyl chloride, vinyl acetate, maleic acid, and vinyl alcohol copolymers, vinyl chloride, vinyl propionate, and vinyl maleate copolymers, vinyl chloride, vinyl propionate, and vinyl alcohol copolymers, vinylidene chloride, vinyl acetate, and maleic acid copolymers, vinylidene chloride, vinyl propionate, and vinyl alcohol copolymers, vinyl chloride, vinyl acetate, and acrylic acid copolymers, and vinyl chloride, vinyl acetate, acrylic acid, and vinyl alcohol copolymers, and these saponified copolymers can be used. Carbon-carbon unsaturated bond can be introduced by modifying a part of hydroxyl group of carboxylic group of these copolymers or modifying a part of hydroxyl group which is produced by saponification of these copolymers. For example, carbon-carbon unsaturated bond can be introduced by reacting a compound having an epoxy ring and carbon-carbon unsaturated bond such as glycidyl acrylate with a part of hydroxyl group of these copolymers, by reacting a part of hydroxyl group or carboxylic group of these copolymers with an NCO group of a polyfunctional isocyanate (e.g., 2,3-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3-dimethylphenylene diisocyanate, 4,4-diphenylmethane diisocyanate, 3,3-dimethyl-4,4-diphenylmethane diisocyanate, hexamethylene diisocyanate, isophoron diisocyanate, dicyclohexyl methane diisocyanate, and tolylene diisocyanate tri adduct product of trimethylol propane and the like) and reacting the residual NCO group with active hydrogen compounds having (metha)acryloyl group (hereinafter, acryloyl groups and methacryloyl groups, etc., are also referred to as (metha)acryloyl groups, etc.) such as hydroxyalkyl(metha)-acrylates, e.g., (metha)acrylic acid, 2-hydroxyethyl 2-hydroxypropyl(metha)acrylate, and 2-hydroxybutyl (metha)acrylate; (metha)acrylamide; or N-methylol (metha)acrylamide.

A polar group can be introduced, for example, by reacting a part of hydroxyl group or carboxylic group of the above-described copolymers or a part of hydroxyl group which is produced by saponifying these copolymers with one of —NCO group of polyfunctional isocyanate, and reacting the residual —NCO groups with hydroxyl compounds having a —$CO_2H$ group, an —$SO_3Na$ group, and an —$OPO_3Na$ group. Introduction of a polar group can be carried out at the same time with the reaction of (metha)acryloyl group. Alternatively, a compound having both a polar group and a (metha)acryloyl group can be used. Manners of introducing these groups should not be limited to those as described above.

Urethane type compounds (B) containing at least one —$CO_2H$ group and at least one carbon-carbon unsaturate bond per molecule, as used in the present invention have any one of a polyester skeleton, polyether skeleton, and polyester ether skeleton as the main chain. Specific examples of dibasic acid used in the present invention include oxalic acid, malonic acid, succinic acid, glutaric acid, adipic acid, sebasic acid, dodecane dicarboxylic acid, maleic acid, fumaric acid, itaconic acid, trimethyl adipic acid, hexahydrophthalic acid, tetrahydrophthalic acid, phthalic acid, isophthalic acid, terephthalic acid, and naphthalene dicarboxylic acid.

Divalent alcohols used in the present invention include ethylene glycol, trimethylene glycol, tetramethylene glycol, pentamethylene glycol, hexamethylene glycol, octamethylene glycol, diethylene glycol, triethylene glycol, tetraethylene glycol, 2,2-dimethylpropane-1,3-diol, 2,2-diethylpropane-1,3-diol, cyclohexane-1,3-diol, cyclohexane-1,4-diol, cyclohexane-1,4-dimethanol, cyclohexane-1,3-dimethanol, 2,2-bis(4-hydroxyethoxycyclohexyl)propane, 2,2-bis(4-hydroxyethoxy-phenyl)propane, and 2,2-bis(4-hydroxyethoxy ethoxy-phenyl)propane. Further, polyester skeleton of lactone type prepared by using γ-butylolactone, δ-valerolactone, or ε-caprolactone can also be used. Isocyanates forming an urethane bond include polyvalent isocyanates such as 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3-dimethylphenylene diisocyanate, 4,4-diphenylmethane diisocyanate, 3,3-dimethyl-4,4-diphenylmethane diisocyanate, hexamethylene diisocyanate, isophorone diisocyanate, dicyclohexylmethane diisocyanate, or tolylene diisocyanate triadduct product of trimethylol propane. A part of the above-described dibasic acid and divalent alcohol can be replaced by trivalent and polyvalent acid and alcohol. —$CO_2H$ groups and acryloyl groups may be positioned at the end or side chain of polyurethane. The methods of introducing these groups are (1) by incorporating at least one of trivalent or polyvalent acid, alcohol, and isocyanate into a urethane skeleton and reacting the urethane having —$CO_2H$ group, —OH group or —NCO group at the side chain with carboxylic acid compound and (metha)acryloyl compounds and (2) by reacting urethane having an isocyanate group at the terminals with an active hydrogen compound having at least one of each of a —$CO_2H$ group, a (metha)acrylol group, and an —OH group.

The acid value of urethane type compounds used in the present invention is preferably from 1 to 30, more preferably from 3 to 20, and most preferably from 5 to 15. The molecular weight thereof is preferably from 1,000 to 100,000, more preferably from 2,000 to 50,000, and most preferably from 3,000 to 30,000. If the acid value is outside the above ranges, dispersibility of ferromagnetic particles becomes poor, electromagnetic properties are degraded and durability becomes poor, too. The average content of (metha)acryloyl groups is from 1.5 to 10 groups, and preferably from 2 to 8 groups, per molecule.

If the molecular weight is not more than 1,000, there easily generate such problems that the magnetic layer of the resulting magnetic recording medium is so strong that the magnetic recording medium readily cracks when bent, and that the magnetic recording medium curls due to shrinkage occurring after radiation exposure for hardening. On the other hand, if the molecular weight is more than 100,000, the dissolubility of urethane (metha)acrylate to a solvent becomes deteriorated, which is unfavorable, because not only handling thereof becomes inconvenient, but also dispersibility of magnetic particles becomes poor and a lot of energy is needed for hardening.

Further, the vinyl type monomers can be added to the present invention. The vinyl type monomers are compounds which are polymerizable by radiation exposure and have at least one carbon-carbon unsaturated bond in a molecule, such as (metha)acrylic acid esters, (metha)-acrylamides, allyl compounds, vinyl ethers, vinyl esters, heterocyclic vinyl compounds, N-vinyl compounds, styrenes, an acrylic acid, a methacrylic acid, crotonic acids, itaconic acids, or olefins. Among those, preferred compounds are those having at least two methacryloyl groups. Specific examples of these compounds are (metha)-acrylates of polyethylene glycol such as diethylene glycol di(metha)acrylate, triethylene glycol di(metha)acrylate, or tetraethylene glycol di(metha)acrylate, trimethylol propane tri(metha)acrylate, pentaerythritol tetra(metha)-acrylate, dipentaerythritol penta (metha)acrylate, dipentaerythritol hexa (metha)acrylate, tris ($\beta$-(metha)acryloyloxyethyl)isocanurate, bis ($\beta$-(metha)acryloyloxyethyl)isocyanurate, or a reaction product of polyisocyanate (e.g., 2,4-tolylene diisocyanate, 2,6-tolylene diisocyanate, 1,3-xylylene diisocyanate, 1,4-xylylene diisocyanate, 1,5-naphthalene diisocyanate, m-penylene diisocyanate, p-phenylene diisocyanate, 3,3-dimethylphenylene diisocyanate, 4,4-diphenylmethane isocyanate, 3,3-dimethyl-4,4-diphenylmethane diisocyanate, hexamethylene diisocyanate, isophorone diisocyanate, dicyclohexylmethane diisocyanate, and tolylene diisocyanate triadduct product of tolymethylol propane) with hydroxy(metha)acrylate compound (e.g., 2-hydroxyethyl (metha)acrylate, 2-hydroxypropyl (metha)acrylate, and the like) and other poly (metha)-acrylates having polyfunctional groups. These monomers can be used alone or in combination.

The mixing ratio of compound(s) (A) and compound(s) (B) is preferably from 20/80 to 90/10 parts by weight, and particularly preferably from 30/70 to 80/20 parts by weight. When compounds (A) and (B) are used in a mixing ratio which is less than the above broad range, the durability decreases. The additive amounts of the above-described vinyl monomers are preferably 50% by weight or less based on the total amounts of compounds (A) and (B). When the additive amounts of vinyl monomers are more than the above range, it is unfavorable because radiation amounts necessary for polymerization becomes high, the magnetic recording medium tends to curl, or high durability cannot be obtained.

The ferromagnetic particles used in the present invention include ferromagnetic iron oxide particles, Co-doped ferromagnetic iron oxide particles, ferromagnetic chrominum dioxide particles, ferromagnetic alloy particles, and barium ferrite. The acicular ratio of ferromagnetic iron oxide and chromium dioxide is generally from 2/1 to 20/1, preferably 5/1 or more, and the average length is about from 0.2 to 2.0 $\mu$m. Ferromagnetic alloy particles have metal content of 75 wt % or more, 80% or more of the metal content is ferromagnetic metal (i.e., Fe, Co, Ni, Fe-Ni, Co-Ni, and Fe-Co-Ni) and the longest diameter thereof is about 1.0 $\mu$m or less. Ferromagnetic particles which are effective in the present invention are ferromagnetic alloy particles having a BET specific surface area of 30, and preferably 45 m$^2$/g or more.

Organic solvents to be used for dispersing ferromagnetic particles and coating a coating composition include ketones such as acetone, methyl ethyl ketone, methyl isobutyl ketone, or cyclohexanone; esters such as methyl acetate, ethyl acetate, butyl acetate, ethyl lactate, or monoethyl ether of glycol acetate; ethers such as ethyl ether, glycol dimethyl ether, glycol monoethyl ether, dioxane, or tetrahydrofuran; aromatic hydrocarbons such as benzene, toluene, or xylene; and chlorinated hydrocarbons such as methylene chloride, ethylene chloride, carbon tetrachloride, chloroform, ethylene chlorohydrin, or dichlorobenzene.

Additives such as a lubricating agent, an abrasive agent, a dispersing agent, an antistatic agent, or a rust preventing agent can be added to the magnetic coating composition of the present invention. A lubricating agent includes a saturated and unsaturated higher fatty acid having 12 or more of carbon atoms, fatty acid ester, higher fatty acid amide, higher alcohol, silicone oil, mineral oil, vegetable oil, and a fluoride compound, which can be added when a coating composition is prepared, or can be coated or sprayed on a surface of a magnetic layer with or without an organic solvent after drying or hardening the magnetic layer by radiation exposure.

Materials for the support used for coating a magnetic coating composition include polyesters such as polyethylene terephthalate or polyethylene-2,6-naphthalate; polyolefins such as polyethylene or polypropylene; cellulose derivatives such as cellulose triacetate; plastics such as polycarbonate, polyimide, or polyamide imide; non-magnetic metals such as aluminum, copper, tin, and zinc or non-magnetic alloy including the above metals; and plastics having a vapor-deposited metal layer such as aluminum.

The shape of the non-magnetic support can be a film, a tape, a sheet, a disk, a card, or a drum, and various materials can be selected depending upon the above shapes.

A backing layer can be provided on the support, on the opposite surface with respect to the magnetic layer, for the purpose of preventing static charging, print through, wow flutter, improving the strength of the magnetic recording medium, and providing a matted layer on the back side of the support.

It is preferred in the present invention that radiation exposure is done after a magnetic coating composition is coated and a calendering treatment is provided. And a calendering treatment can be provided after radiation exposure, or radiation exposure can be done additionally.

The radiation exposed to a magnetic layer in the present invention includes electron beams, $\gamma$-rays, $\beta$-rays, or ultraviolet rays, with electron beams being the most preferred. As a device for accelerating electron beams, there are a scanning method, a double scanning method, a curtain beam method, or a broad beam curtain method. The electron beam radiation can be carried out using an accelerating voltage of from 100 to 1,000 KV, preferably from 150 to 300 KV, and an absorption dose of from 1 to 20 Mrads, preferably from 3 to 15 Mrads. When the accelerating voltage is 100 KV or less, the transmitted amount of energy is sufficient and when the acceleraing voltage is 1,000 KV or more, the energy efficiency of the polymerization is lowered and is uneconomical. When the absorption dose is 1 Mrad or less, the hardening reaction is insufficient to obtain a magnetic layer having sufficient mechanical strength. When the absorption dose is 20 Mrads or more, the energy efficiency used for the hardening reaction is lowered or a radiated object generates heat, whereby a plastic support tends to deform.

The present invention is further illustrated in more detail by the following Examples and Comparative Examples. In the Examples and Comparative Examples, all parts are by weight.

EXAMPLE 1

A magnetic coating composition having the following components was mixed and kneaded in a ball mill for 50 hours.

| | |
|---|---|
| Fe alloy particles (1,500 Oe, BET specific surface area: 50 m²/g | 400 parts |
| Binder composition | |
| Copolymer of vinyl chloride and acrylic acid (acid value: 13, molecular weight: 20,000, average content of acryloyl group: 2.8/molecule) | 60 parts |
| Urethane acrylate (acid value: 10, molecular weight: 10,000, average content of acryloyl group: 3/molecule) | 40 parts |
| Stearic acid | 4 parts |
| Butyl stearate | 4 parts |
| Al₂O₃ | 4 parts |
| Carbon black | 10 parts |
| Methyl ethyl ketone | 800 parts |

After dispersion, the magnetic coating composition was coated using a doctor blade method on a polyethylene terephthalate support having a thickness of 10 μm in a dry thickness of 3 μm, which was subjected to orientation with cobalt magnets, dried to evaporate a solvent at 100° C. for 1 minute and was subjected to calendering treatment. Then, the resulting magnetic layer was exposed to electron beam radiation at an accelerating voltage of 165 KV and beam current of 6 mA to have an absorption dose of 7 Mrads, and was slit to a ½ inch width to obtain a magnetic tape Sample No. 1 for video recording.

The same manners as in Example 1 were repeated to prepare magnetic tape samples except changing the binder composition of Example 1 to that as shown in Table 1. The results of evaluating these sample tapes are shown in Table 2.

EVALUATION METHOD

Measurement of acid value:

1 g of a sample and phenolphthalene as an indicator were dissolved into tetrahydrofuran. Potassium hydroxide dissolved in a solution of ethyl alcohol and water (95/5 vol%) was then dropwise added thereto. The acid value is shown in terms of weight (mg) of potassium hydroxide required for the above titration.

Time of still image durability:

Video signals were recorded on tapes (each sample tape) using a VHS video tape recorder "NV8200", trademark for a product manufactured by Matsushita Electric Industrial Co., Ltd., and the time of still image durability was shown in terms of the time for reproduced still images to lose their clarity. This test was done at 5° C. and 80% relative humidity.

S/N:

Gray signals at 50% set up (an intermediate density between white (0%) and black (100%)) were recorded using the above-described video tape recorder and deviation from 50% set up was measured as noise using Model 925C S/N meter produced by SHIBASOKU Co., Ltd., and is shown by a relative value when the noise of Sample No. 5 is taken as 0 dB.

Storage stability:

The magnetic coating composition was stored for 24 hours at room temperature, and stirred for 10 minutes, and thereafter, a magnetic tape was prepared in the manner as described in Example 1. Then the video S/N was measured. The storage stability is shown in terms of the difference of video S/N between video S/N of a tape prepared by using stored magnetic coating composition and video S/N of the tape prepared by using non-stored coating composition, wherein the video S/N of the tape prepared by using non-stored composition is taken as 0 dB.

TABLE 1

| | | |
|---|---|---|
| Example 2 | Copolymer of vinyl chloride and acrylic acid (Acid value: 13, molecular weight: 25,000, average content of acryloyl group: 3.4/molecule) | 60 parts |
| | Urethane acrylate (Acid value: 5, molecular weight: 8,000, average content of acryloyl group: 3/molecule) | 40 parts |
| Example 3 | Copolymer of vinyl chloride and acrylic acid (Acid value: 6, molecular weight: 15,000, average content of acryloyl group: 5/molecule) | 60 parts |
| | Urethane acrylate (Acid value: 10, molecular weight: 15,000, average content of acryloyl group: 5/molecule) | 40 parts |
| Example 4 | Copolymer of vinyl chloride, vinyl acetate and acrylic acid (Acid value: 20, molecular weight: 15,000, average content of acryloyl group: 4/molecule) | 60 parts |
| | Urethane acrylate (Acid value: 20, molecular weight: 8,000, average content of acryloyl group: 5/molecule) | 40 parts |
| Example 5 | Copolymer of vinyl chloride and acrylic acid (Acid value: 3, molecular weight: 15,000, average content of acryloyl group: 4/molecule) | 60 parts |
| | Urethane acrylate (Acid value: 3, molecular weight: 10,000, average content of acryloyl group: 5/molecule) | 40 parts |
| Comparative Example 1 | Copolymer of vinyl chloride and acrylic acid as same as that in Example 1 | 60 parts |
| | Urethane acrylate (Acid value: 0.5, molecular weight: 10,000, average content of acryloyl group: 3/molecule) | 40 parts |
| Comparative Example 2 | Copolymer of vinyl chloride and acrylic acid (Acid value: 0.5, molecular weight: 15,000, average content of acryloyl group: 3/molecule) | 60 parts |
| | Urethane acrylate (Acid value: 10, molecular weight: 10,000, average content of acryloyl group: 3/molecule) | 40 parts |
| Comparative Example 3 | Copolymer of vinyl chloride and acrylic acid as same as that in Example 1 | 60 parts |
| | Urethane acrylate (Acid value: 0, molecular weight: 10,000, average content of acryloyl group: 3/molecule) | 40 parts |
| Comparative Example 4 | Copolymer of vinyl chloride and acrylic acid (Acid value: 40, molecular weight: 10,000, average content of acryloyl group: 5/molecule) | 60 parts |
| | Urethane acrylate (Acid value: 10, molecular weight: 20,000, average content of acryloyl group: 4/molecule) | 40 parts |
| Comparative Example 5 | Copolymer of vinyl chloride and acrylic acid as same as that in | 60 parts |

TABLE 1-continued

| | Example 1 | |
|---|---|---|
| | Urethane resin | 40 parts |
| | (Acid value: 10, molecular weight: 50,000, average content of acryloyl group: 0/molecule) | |

TABLE 2

| Sample No. | Video S/N (dB) | Chroma S/N (dB) | Storage Stability (dB) | Still Durability |
|---|---|---|---|---|
| Example 1 | +1.8 | +2.0 | −0.3 | >60 min. |
| Example 2 | +1.5 | +1.7 | −0.6 | >60 min. |
| Example 3 | +0.7 | +1.6 | −0.5 | >60 min. |
| Example 4 | +0.6 | +0.8 | −0.4 | >60 min. |
| Example 5 | 0.0 | 0.0 | −0.7 | >60 min. |
| Comparative Example 1 | −1.0 | −1.0 | −1.8 | 21 min. |
| Comparative Example 2 | −1.8 | −1.5 | −2.0 | 14 min. |
| Comparative Example 3 | −2.1 | −1.8 | −2.2 | 15 min. |
| Comparative Example 4 | −2.1 | −2.1 | −3.6 | 8 min. |
| Comparative Example 5 | −0.6 | −1.0 | −3.0 | 1 min. |

It is apparent from the above that the magnetic recording medium containing binders in combination as defined in the present invention exhibits excellent electromagnetic properties, low friction coefficient, excellent still durability, and excellent storage stability.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support and a magnetic layer, said magnetic layer containing as a binder at least one compound selected from each of the compound groups (A) and (B) that has been exposed to radiation, wherein (A) is polyvinyl chloride type compounds having a molecular weight of 5,000 to 50,000 containing at least on $CO_2H$ group and at least one carbon-carbon unsaturated bond per molecule and having an acid value of from 1 to 30; and (B) is polyurethane type compounds having a molecular weight of 1,000 to 100,000 containing at least one —$CO_2H$ group and at least one carbon-carbon unasturated bond per molecule and having an acid value of from 1 to 30, wherein the mixing ratio of compound(s) (A) and compound(s) (B) is from 20/80 to 90/10 parts by weight.

2. A magnetic recording medium as in claim 1, wherein the mixing ratio of compound(s) (A) and compound(s) (B) is from 30/70 to 80/20 parts by weight.

3. A magnetic recording medium as in claim 1, wherein (B) is polyurethane acrylate or methacrylate.

4. A magnetic recording medium as in claim 1, wherein ferromagnetic particles are used in the magnetic layer, and said particles are ferromagnetic alloy particles having a BET specific surface area of 30 $m^2/g$ or more.

5. A magnetic recording medium as in claim 1, wherein the acid value is from 3 to 20.

6. A magnetic recording medium as in claim 1, wherein the acid value is from 5 to 15.

7. A magnetic recording medium as in claim 1, wherein the average content of carbon-carbon unsaturated bonds is from 1.5 to 20 per molecule.

8. A magnetic recording medium as in claim 1, wherein the average content of carbon-carbon unsaturated bonds is from 2 to 15 per molecule.

9. A magnetic recording medium as in claim 5, wherein the average content of carbon-carbon unsaturated bonds is from 1.5 to 20 per molecule.

10. A magnetic recording medium as in claim 6, wherein the average content of carbon-carbon unsaturated bonds is from 2 to 15 per molecule.

11. A magnetic recording medium as in claim 3, wherein the acid value is from 3 to 20.

12. A magnetic recording medium as in claim 3, wherein the acid value is from 5 to 15.

13. A magnetic recording medium as in claim 3, wherein the average content of acryloyl or methacryloyl groups is from 1.5 to 10 groups per molecule.

14. A magnetic recording medium as in claim 3, wherein the average content of acryloyl or methacryloyl groups is from 2 to 8 groups per molecule.

15. A magnetic recording medium as in claim 4, wherein the BET specific surface area is 45 $m^2/g$ or more.

16. A magnetic recording medium as in claim 1, wherein the polyvinyl chloride type compound has a molecular weight of from 10,000 to 30,000.

17. A magnetic recording medium as in claim 1, wherein the polyurethane type compound has a molecular weight of from 3,000 to 30,000.

* * * * *